(No Model.)

C. B. BEACH.
METHOD OF CONVERTING TIRES INTO BARS, &c.

No. 347,459. Patented Aug. 17, 1886.

WITNESSES:
J. Snowden Bell.
C. M. Clarke.

INVENTOR,
Clifton B. Beach.
George H. Christy, Att'y.

UNITED STATES PATENT OFFICE.

CLIFTON B. BEACH, OF CLEVELAND, OHIO.

METHOD OF CONVERTING TIRES INTO BARS, &c.

SPECIFICATION forming part of Letters Patent No. 347,459, dated August 17, 1886.

Application filed May 12, 1886. Serial No. 201,912. (No model.)

*To all whom it may concern:*

Be it known that I, CLIFTON B. BEACH, residing at Cleveland, in the county of Cuyahoga and State of Ohio, a citizen of the United States, have invented or discovered a certain new and useful Improvement in Processes for the Conversion of Steel Railroad-Tires into Bars or Billets, of which improvement the following is a specification.

Figure 1:
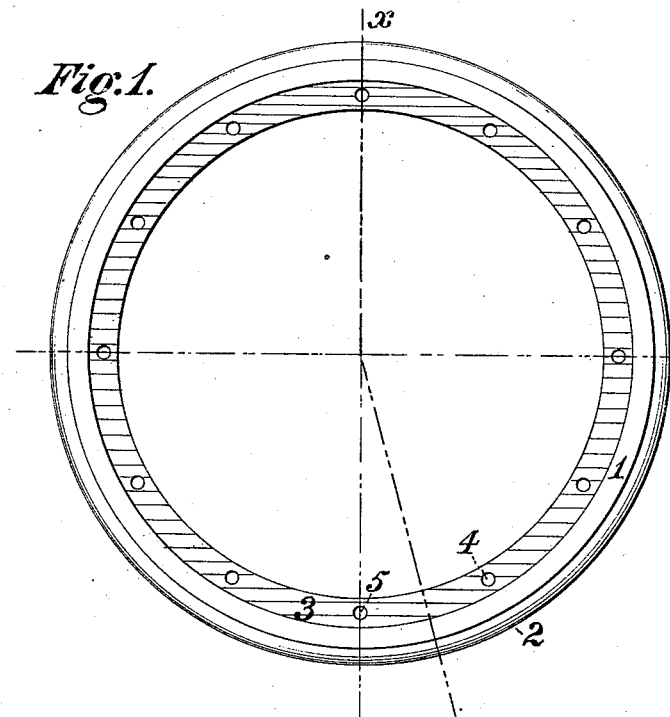
Figure 2:
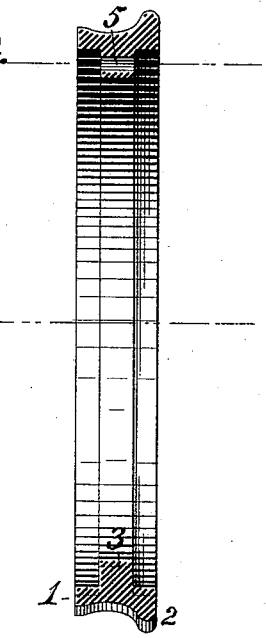
Figure 3:
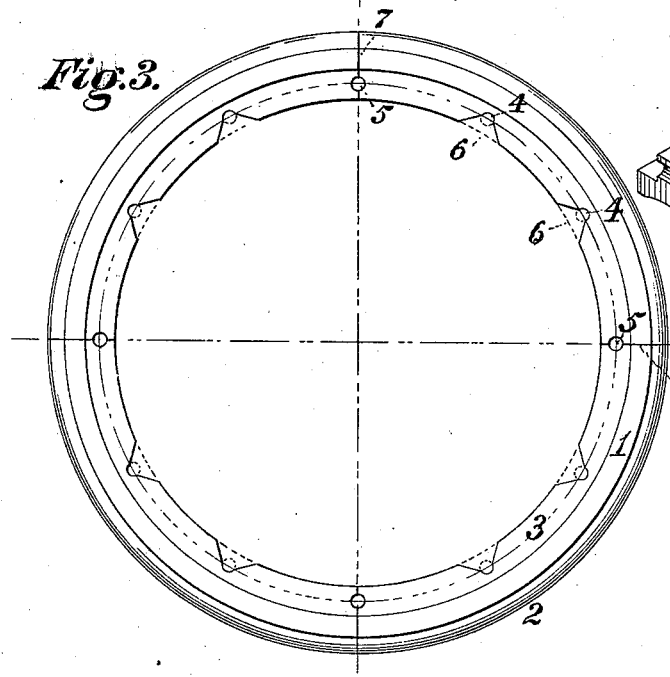
Figure 4:
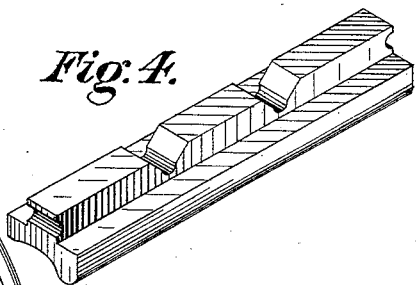
Figure 5:
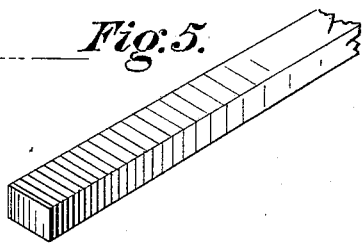

In the accompanying drawings, which make part of this specification, Figure 1 is a side view, in elevation, of a railroad-wheel tire adapted to the practice of my invention; Fig. 2, a transverse section through the same at the line $x$ $x$ of Fig. 1; Fig. 3, a plan view of the same when divided into segments; Fig. 4, a view in perspective and on an enlarged scale of a straightened segment, and Fig. 5 a similar view of a finished bar as produced from a segment of the tire.

My present invention is an improvement in the application of that for which Letters Patent of the United States No. 335,878 were granted and issued to me under date of February 9, 1886, to tires having an inner flange perforated by bolt-holes; and its object is to further promote the utilization of worn or defective railroad-wheel tires of such type by effecting a reduction in the quantity of metal required to be removed therefrom in converting them into bars or billets, and in rendering practicable the production of bars of greater length than have heretofore been obtainable.

To this end my invention, generally stated, consists in a novel process of first dividing the tire into a series of segments containing no openings surrounded by a continuous wall of metal by gouging or cutting away the metal on the inner side of any desired number of bolt-holes in its inner flange, and cutting the tire radially through the remaining bolt-holes, and thereafter reducing said segments to straight rectangular bars or billets.

The improvement claimed is hereinafter fully set forth.

The elimination from the tire of all openings which are surrounded by a continuous wall or body of metal is an essential feature of the process set forth in Letters Patent No. 335,878, before referred to; and the specific method of effecting such elimination described in said Letters Patent consists in dividing the tire into a series of segments by radial cuts passing through the centers of the several bolt-holes, or by detaching circumferentially a portion of the inner flange. Where, as is now frequently the case, the inner flange has a comparatively large number of bolt-holes, the segments produced by a radial cut through each hole are so short as to form billets which are lighter than is desirable, and, on the other hand, the detachment of the inner flange to a line passing circumferentially through the centers of the bolt-holes or tangentially thereto involves a considerable loss of metal, which, if retained, would be capable of utilization as part of the finished billet or billets. Under my present invention I am enabled to make the segments as long as may be desired, by reducing the number of radial divisions, and also to retain an increased quantity of metal in the billets by removing only that which immediately adjoins the bolt-holes, which are not radially divided.

In the practice of my invention the tire 1, having the usual external or rail flange, 2, and an inner flange, 3, in which are formed a series of bolt-holes, 4 5, for attachment to the body of the wheel, is first converted into a series of segments of such length as may be deemed most advantageous and having no openings surrounded by a continuous wall or body of metal. This operation is effected by gouging or cutting away from the bolt-holes 4 intermediate between the ends of the determined number of segments (that is to say, from groups of two or more adjacent bolt-holes separated by a bolt-hole, 5, which is not to be so gouged or cut) the metal adjacent thereto, from their centers to the inner edge of the flange 3, thus removing therefrom comparatively small portions of metal, 6, as indicated by the dotted and inclined full lines in Fig. 3, and by dividing the tire by the radial cuts 7, passing through the centers of the bolt-holes 5, into the number of segments determined on. The inner portions of metal, 6, may be conveniently detached by means of a suitable press carrying a reciprocating gouging or cutting tool, beneath which the tire, which has been previously heated, is supported upon a revolving table, by means of which the several bolt-holes, 4, adjacent to which the metal is to be cut away are successively presented to the action of the tool. The tire may be radially divided by a saw or other proper cutting mechanism, to which is presented at the dividing-lines of the several segments in the rotation of its supporting-table. The segments resultant upon the removal of the portions of metal 6 and the radial division of the tire, as above described, are then passed between straightening-rolls, and thereby reduced to straight bars or blooms, in which, as shown in Fig. 4, there are end and side recesses at the bolt-holes 5 and 4, but no openings which are surrounded by a continous wall of metal, and which would for such reason form a seam in the product. These blooms are then reduced to the rectangular section desired by successive passes between pairs of rolls having suitable supporting roughing-grooves for the reception of the inner and outer flanges and finishing-grooves of form and dimensions proper to convert the blooms into billets or bars of reduced transverse area and determined section and of correspondingly-increased length, which are subsequently cut into proper lengths for utilization as required.

The rolls employed in the reduction of the blooms, not constituting of themselves any part of my present invention, and being, moreover fully set forth in my Letters Patent Nos. 335,878 and 335,879, dated February 9, 1886, need not be at length described.

I claim herein as my invention—

1. As an improvement in the art of converting flanged steel tires into billets or bars, the detachment of the requisite portion of the inner flange of tire opposite a determined number of bolt-holes by gouging or cutting away the metal adjacent to groups of two or more bolt-holes separated by an intermediate bolt-hole from the central portion of the bolt-holes of said groups to the inner edge of the flange in which they are located, substantially as set forth.

2. The improvement in the method of converting flanged steel tires into billets or bars, which consists in dividing a tire into a series of segments having no openings surrounded by a continuous wall or body of metal by gouging or cutting away the metal of the flange adjacent to groups of two or more bolt-holes separated by an intermediate bolt-hole from the central portion of the bolt-holes of said groups to the inner edge of the flange in which they are located, and cutting the tire radially through the centers of the bolt-holes intermediate or interposed between said groups, substantially as set forth.

3. The improvement in the method of converting flanged steel tires into billets or bars, which consists in first dividing the tire into a series of segments containing no openings surrounded by a continuous wall or body of metal by gouging or cutting away the metal on the inner side of any determined number of bolt-holes in its inner flange and cutting the tire radially through the remaining bolt-holes, and thereafter reducing said segments to straight rectangular bars or billets in roughing-rolls having flange-supporting grooves and in reducing finishing-rolls, substantially as set forth.

In testimony whereof I have hereunto set my hand.

CLIFTON B. BEACH.

Witnesses:
T. H. BUSHNELL,
HARRY MELLEN.